(12) United States Patent
Gonze et al.

(10) Patent No.: US 7,818,960 B2
(45) Date of Patent: Oct. 26, 2010

(54) SCR COLD START HEATING SYSTEM FOR A DIESEL EXHAUST

(75) Inventors: Eugene V. Gonze, Pinckney, MI (US); Michael J. Paratore, Jr., Howell, MI (US); Frank Ament, Troy, MI (US)

(73) Assignee: GM Global Technology Operations, Inc.

( * ) Notice: Subject to any disclaimer, the term of this patent is extended or adjusted under 35 U.S.C. 154(b) by 895 days.

(21) Appl. No.: 11/685,918

(22) Filed: Mar. 14, 2007

(65) Prior Publication Data
US 2008/0223019 A1 Sep. 18, 2008

(51) Int. Cl.
F01N 3/00 (2006.01)
F01N 3/10 (2006.01)

(52) U.S. Cl. .............. 60/286; 60/284; 60/285; 60/295; 60/300; 60/301; 60/303

(58) Field of Classification Search ........... 60/273, 60/284, 285, 286, 295, 300, 301, 303
See application file for complete search history.

(56) References Cited

U.S. PATENT DOCUMENTS

| | | | |
|---|---|---|---|
| 4,976,929 A | 12/1990 | Cornelison et al. | |
| 5,224,335 A * | 7/1993 | Yoshizaki | 60/300 |
| 5,394,331 A | 2/1995 | Dudek et al. | |
| 5,904,902 A * | 5/1999 | Matuoka et al. | 422/174 |
| 6,176,081 B1 * | 1/2001 | Shimasaki et al. | 60/300 |
| 6,279,603 B1 | 8/2001 | Czarnik et al. | |
| 6,713,025 B1 * | 3/2004 | Ivanescu et al. | 422/177 |
| 6,941,746 B2 | 9/2005 | Tarabulski et al. | |
| 2004/0223892 A1 * | 11/2004 | Kojima | 422/177 |
| 2006/0053775 A1 | 3/2006 | Powell et al. | |
| 2009/0007549 A1 * | 1/2009 | Hagio et al. | 60/286 |

FOREIGN PATENT DOCUMENTS

| | | | |
|---|---|---|---|
| DE | 102005013707 | | 9/2006 |
| JP | 10299461 | | 11/1998 |
| JP | 11030119 A | * | 2/1999 |
| JP | 2004225579 A | * | 8/2004 |
| JP | 2005256727 A | * | 9/2005 |

OTHER PUBLICATIONS

Hamaguchi et al., Machine Translation of JP 10-299461 A, published Nov. 10, 1998.*
Nakamura, Machine Translation of JP 2005-256727 A, published Sep. 22, 2005.*
Nakamura, English Abstract of JP 2005-256727 A, published Sep. 22, 2005.*
Hirabayashi, Machine Translation of JP 11-030119 A, published Feb. 2, 1999.*

(Continued)

*Primary Examiner*—Thomas E Denion
*Assistant Examiner*—Audrey Klasterka (57) ABSTRACT

An exhaust system includes a heating element that is disposed downstream from an engine and that introduces thermal energy into an exhaust of the engine. A selective catalyst reduction (SCR) unit is disposed downstream from the heating element and filters nitrogen oxides (NOx) within the exhaust. A control module is in communication with and energizes the heating element based on temperature of the SCR unit.

21 Claims, 4 Drawing Sheets

OTHER PUBLICATIONS

Hirabayashi, English Abstract of JP 11-030119 A, published Feb. 2, 1999.*
Gabe et al., English Abstract of JP 2004-225579 A, published Jan. 21, 2003.*
Hamaguchi et al., translation of paragraph 0025 from JP 10-299461, published Nov. 10, 1998, translation received Mar. 3, 2010.*
Hamaguchi et al., translation of paragraph 0025 from JP 10-299461, published Nov. 10, 1998, translation received Mar. 3, 2010.*

* cited by examiner

SCR COLD START HEATING SYSTEM FOR A DIESEL EXHAUST

FIELD

The present disclosure relates to exhaust systems, and more particularly to emission reduction techniques associated therewith.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Exhaust systems for automobiles are used to filter and reduce the emission of nitrogen oxides (NOx). Several technologies have been developed to decrease NOx emissions. The technologies include passive methods that use catalysts and active methods, such as electrochemical catalysis and photocatalytical, plasma, and laser techniques. For example, rich-burning engines use a three-way catalyst to reduce NOx emissions. The three-way catalyst typically includes a combination of noble metals deposited on a stabilized alumina carrier. The three-way catalyst works with a feedback system that directs an engine to blend air and fuel in stoichiometric proportions. By controlling an air-to-fuel ratio of the engine, hydrocarbons (HCs) and carbon monoxide (CO) are produced to convert NOx and HCs to carbon dioxide, water, hydrogen gas, and/or nitrogen gas.

The NOx reducing performance of the three-way catalyst, which is the standard NOx abatement technology for gasoline engines, deteriorates rapidly in the presence of oxygen. Thus, this technology is ineffective in controlling NOx emissions in lean exhaust gases. Approaches that control NOx emissions in lean-burn engines, i.e., engines such as diesel engines that burn fuel in excess oxygen, include catalytic decomposition of nitrogen monoxide (NO) units and selective catalytic reduction (SCR) units.

The decomposition of NOx in a diesel exhaust requires high activation energy and thus is inhibited. Therefore, a catalyst is necessary to lower this activation energy in order to facilitate the decomposition. Various catalysts have been used to decompose NOx, including precious metals, metallic oxides, zeolites-based catalysts and copper ion-exchanged zeolite.

Although the use of a catalyst aids in the reduction of the activation energy, present diesel engines at startup and when moderately operated tend to exhibit cool exhaust temperatures. This delays effectiveness of an SCR unit. An SCR unit needs to reach a minimum operating temperature to effectively filter NOx. Typically, an SCR unit does not efficiently clean an exhaust until several minutes after an engine is started.

SUMMARY

Accordingly, an exhaust system is provided that includes a heating element that is disposed downstream from an engine and that introduces thermal energy into an exhaust of the engine. A selective catalyst reduction (SCR) unit is disposed downstream from the heating element and filters nitrogen oxides (NOx) within the exhaust. A control module is in communication with and energizes the heating element based on temperature of the SCR unit.

In other features, a diesel exhaust system is provided and includes a heating element that is disposed downstream from a diesel engine and that introduces thermal energy into an exhaust of the diesel engine. A diesel oxidation catalyst is disposed downstream from the heating element and removes at least one of hydrocarbons and carbon monoxide from the exhaust. A selective catalyst reduction (SCR) unit is disposed downstream from the diesel oxidation catalyst and filters nitrogen oxides (NOx) within the exhaust. A control module is in communication with and energizes the heating element based on temperature of the SCR unit.

In still other features, a method of operating an exhaust system is provided and includes generating an engine startup signal. An electrically heated catalyst (EHC), which is disposed downstream from a diesel engine and that introduces thermal energy into an exhaust of the diesel engine, is energized based on the engine startup signal. Nitrogen oxides (NOx) within the exhaust system are filtered via a selective catalyst reduction (SCR) unit that is disposed downstream from the EHC.

Further areas of applicability will become apparent from the description provided herein. It should be understood that the description and specific examples are intended for purposes of illustration only and are not intended to limit the scope of the present disclosure.

DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 1:
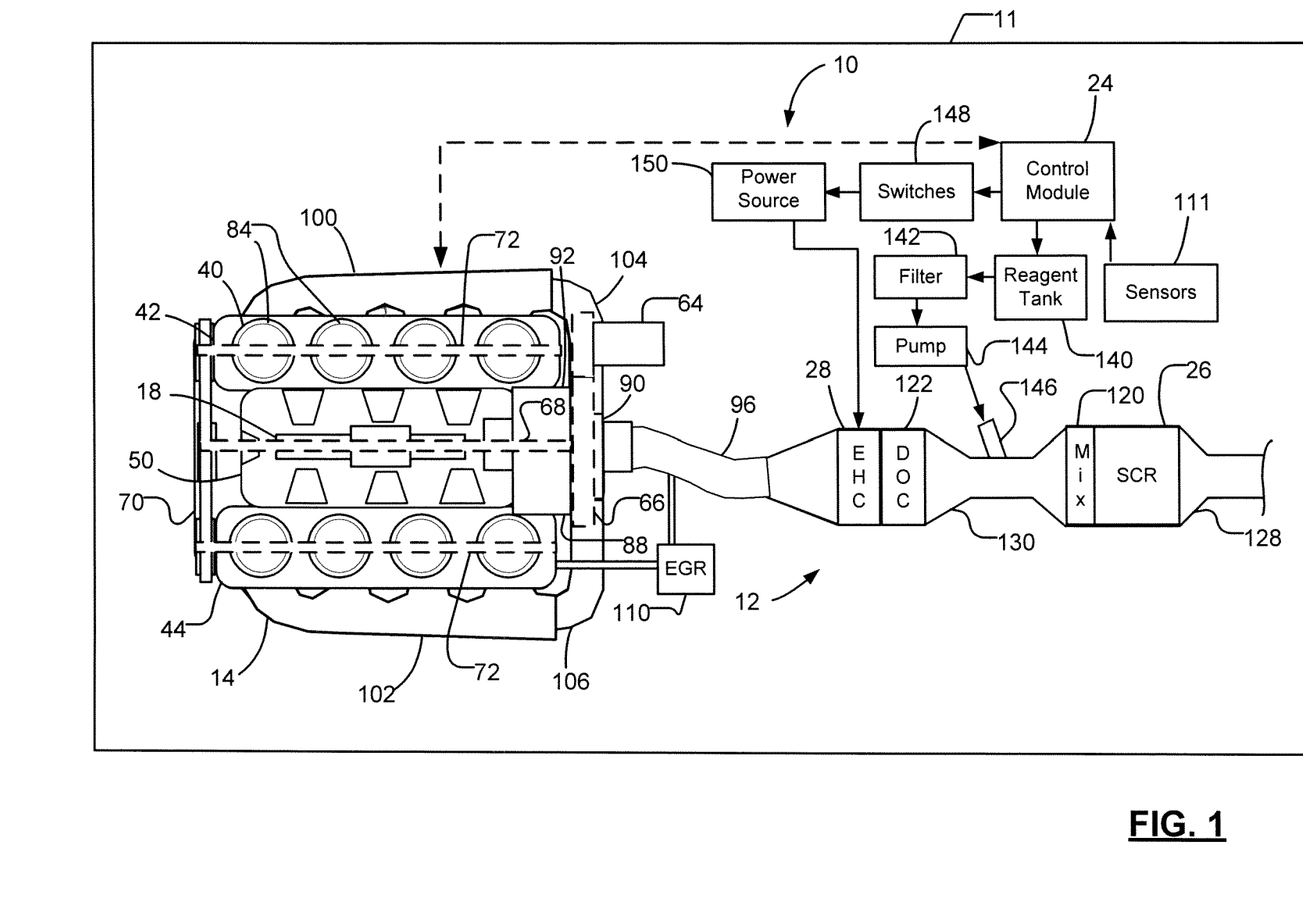
FIG. 1 is a functional block diagram of a portion of an exemplary diesel engine system incorporating a selective catalyst reduction heating system having an electrically heated catalyst (EHC) and a selective catalyst reduction (SCR) unit in accordance with an embodiment of the present invention.
Figure 2:
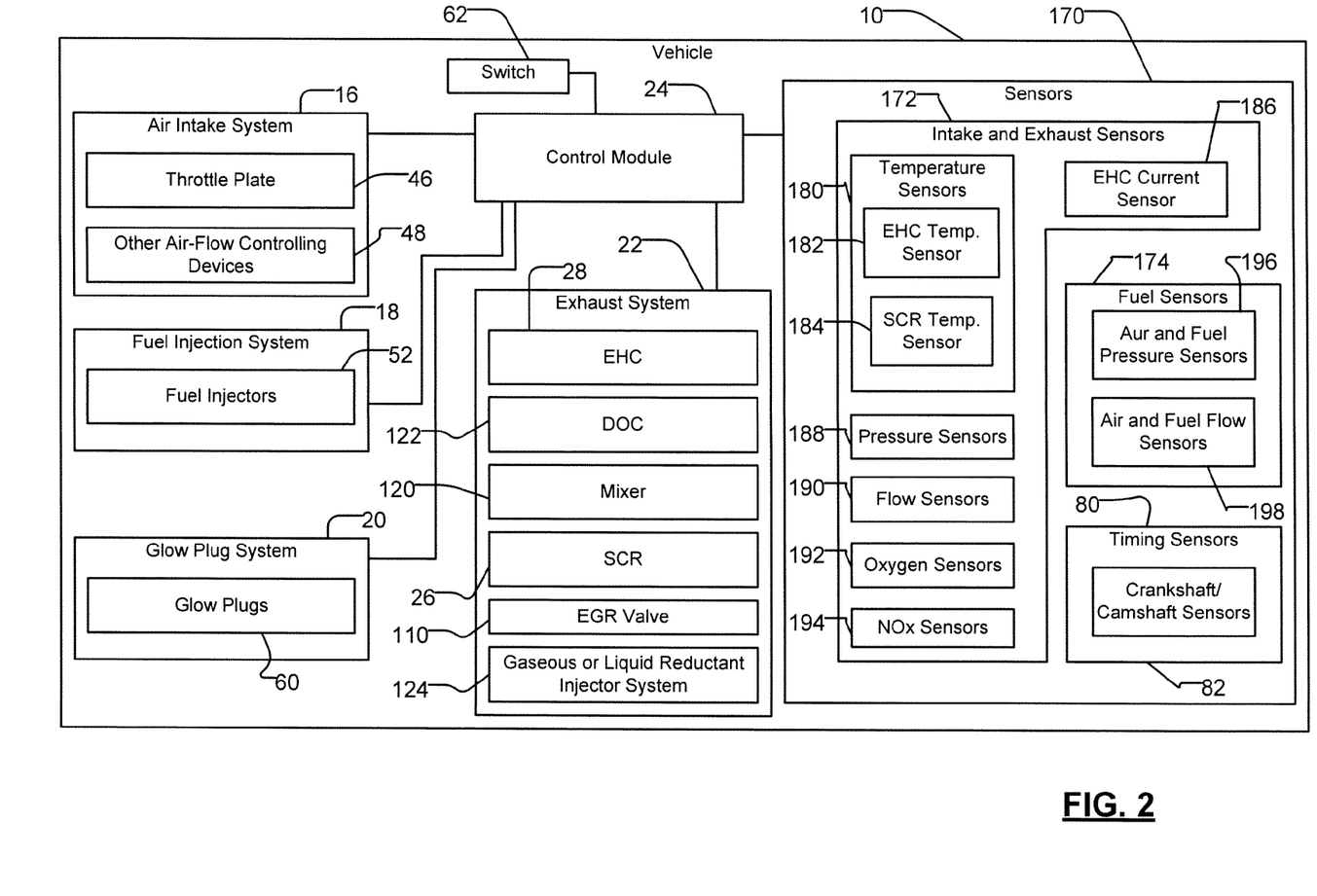
FIG. 2 is functional block diagram of another portion of the exemplary diesel engine system of FIG. 1.

Referring to FIGS. 1-2, functional block diagrams of portions of an exemplary diesel engine system 10 of a vehicle 11 including a selective catalyst reduction (SCR) heating system 12 is shown. It is appreciated that the diesel engine system 10 is merely exemplary in nature and that the SCR heating system 12 described herein may be implemented in various engine systems that have a SCR unit. Such engine systems may include, but are not limited to, gasoline direct injection engine systems and homogeneous charge compression ignition engine systems.

The engine system 10 includes a diesel engine 14, an air intake system 16, a fuel injection system 18, a glow plug system 20 (or ignition system when applied to a gasoline spark ignition engine), and an exhaust system 22. In a simplified embodiment, the SCR heating system 12 includes a control module 24, an SCR unit 26, and an electrically heated catalyst (EHC) 28. The EHC 28 is disposed upstream from the SCR unit 26. In more involved embodiments, the SCR heating system 12 may include the air intake system 16, the fuel injection system 18, the glow plug system 20, the exhaust system 22, and related elements, components and systems thereof.

The SCR heating system 12 heats the SCR unit 26 early in an engine startup process. This allows temperature of the SCR unit 26 to increase to an active operating temperature earlier in federal test procedure (FTP) cycles, which in turn reduces exhaust emissions. Traditional diesel engines startup and operate with cool exhaust temperatures. From initial startup until a time at which catalyst aftertreatment systems reach an active operating temperature, traditional exhaust systems are inefficient in preventing exhaust emissions. The time frame between startup and the point in time at which the exhaust system reaches efficient active operation can be several minutes. When operating at temperatures below the active operating temperature, which for some SCR units is approximately 200° C., untreated exhaust can be emitted. The embodiments disclosed and described herein increase the temperature of the aftertreatment systems quickly and early on in an engine startup to significantly reduce exhaust emissions.

The engine 14 combusts an air/fuel mixture to produce drive torque. The engine 14 includes eight cylinders 40 configured in adjacent cylinder banks 42, 44 in V-type layout. Although FIG. 1 depicts eight cylinders (N=8), it can be appreciated that the engine 14 may include additional or fewer cylinders. For example, engines that have 2, 4, 5, 6, 8, 10, 12 and 16 cylinders are contemplated. It is also anticipated that the SCR heating system 12 may be implemented and associated with in an inline-type or another type of cylinder configuration.

The air intake system 16 may include a throttle plate 46 and/or other air flow controlling devices 48. The throttle plate 46 may be located proximate to or in an intake manifold 50. The intake manifold 50 is mounted on the engine 14.

The fuel injection system 18 may be in the form of a common rail fuel injection system, as shown. The fuel injection system 18 includes fuel injectors 52. Each fuel injector 52 is associated with one of the cylinders 40. The fuel system 18 provides fuel to engine 14, which may be mixed with air and ignited via compression and heat and/or by the glow plug system 20. Ignition of the air/fuel mixture provides power for the engine 14 to propel the vehicle 11.

The glow plug system 20 includes glow plugs 60 (or spark plugs when applied to a gasoline spark ignition engine). Glow plugs 60 may be used on a diesel engine to initiate an ignition processes during startup. The purpose of the glow plug system 20 is to pre-heat the cylinders 40 or to pre-heat combustion pre-chambers in an indirect injection engine for easier starting when the engine 14 is cold.

A switch 62 starts the operation of control module 24. The switch 62 may be an ignition switch, a manually controlled switch, a control switch, a solid-state switch, a switch within the control module 24, or some other switch. The control module 24 cranks the engine 14 by signaling a starter 64 to turn a flywheel 66, which cranks a crankshaft 68. The crankshaft 68 operates a timing chain 70, which turns camshafts 72. The control module 24 synchronizes the SCR heating system 12, the engine 14, the air intake system 16, the fuel system 18 and the glow plug system 20. The control module 24 may use timing sensors 80, such as crankshaft position and camshaft position sensors 82 to determine locations of pistons 84 within each of the cylinders 40, as well as to determine ignition stroke timing and other timing parameters. The positions of the crankshaft 68 and camshafts 72 may determine the position of each piston 84 in each of the cylinders 40. In general, the position of the camshafts 72 determines whether the pistons 84, in each of the cylinders 40, are on an intake or a compression stroke.

Air is drawn into the intake manifold 50 across the throttle plate 46. Air is drawn into the cylinders 40 from the intake manifold 50 and is compressed therein. Fuel is injected into cylinders 40 by the fuel injection system 18 and thermal energy (heat) of the compressed air and/or from the glow plug system 20 ignites the air/fuel mixture. Exhaust gases are exhausted from the cylinders 40 into the exhaust system 22. In some instances, the engine system 10 can include a turbocharger 88 that uses an exhaust driven turbine 90 to drive a compressor 92 that compresses the air entering the intake manifold 50. The compressed air typically passes through an air cooler before entering into the intake manifold 50.

In a 4-stroke cycle engine, as illustrated for an embodiment of the present invention, each piston 84 has four strokes: an intake stroke, a compression stroke, an expansion or power stroke, and an exhaust stroke. The positions of the crankshaft 68 and camshafts 72 allow the control module 24 to determine when a piston is beginning an intake stroke or ending a compression stroke. When a piston is near the beginning of an intake stroke the control module 24 signals the fuel injectors 52 to operate. The fuel injectors 52 inject fuel into the intake manifold 50, which is followed by the engine cylinders 40. Although the fuel is described as being injected into the intake manifold 50, it may also be directly injected into the cylinders 40. When ending a compression stroke heat within the cylinders 40 ignites the air/fuel mixture, which was allowed to enter the engine cylinder during the intake stroke, to create a power stroke to drive the crankshaft 68. After the fuel has been ignited in an engine cylinder, resulting exhaust is released on the exhaust stroke through exhaust system 22.

The exhaust system 22 includes exhaust manifolds 100, 102, exhaust conduits 96, 104, 106 and the SCR heating system 12, which for the embodiment shown may be referred to as or included as part of a diesel exhaust filtering system. The exhaust manifolds 100, 102 direct the exhaust exiting the corresponding cylinder banks 40, 44 into the exhaust conduits 96, 104, 106. Optionally, an EGR valve 110 may recirculate a portion of the exhaust back into the intake manifold 50. The remainder of the exhaust is directed into the turbocharger 88 to drive the turbine 90. The turbine 90 facilitates the compression of the fresh air received from the intake manifold 50. A combined exhaust stream flows from the turbocharger 88 through the exhaust conduit 96.

The filtering system 12 includes the SCR unit 26, the EHC 28, a mixer 120, a diesel oxidizing catalyst (DOC) 122, and a gaseous or liquid reductant injector system 124. The mixer 120 is disposed upstream from the SCR unit 26. The DOC 122 is disposed upstream from the mixer 120. The EHC 28 is disposed upstream from the DOC 122. The positional order shown of the SCR unit 26, the EHC 28, the mixer 120, and the DOC 122 is for example purposes only, other arrangements may be implemented. For the example shown, the SCR unit 26 and the mixer 120 are part of and packaged within a first canister 128. The EHC 28 and DOC 122 are part of and packaged within a second canister 130. The second canister 130 is disposed upstream from the first canister 128 and is coupled between the turbine 90 and the first canister 128.

The DOC 122 may have a core substrate with multiple layers including one or more catalyst layers and a washcoat layer, which increases surface area of the core substrate. The core substrate may be formed of a honeycomb of ceramic or stainless steel and coated with one or more precious metals. Examples of precious metals are platinum, palladium, rhodium, cerium, iron, manganese, nickel, and copper. The washcoat may include silicon or aluminum.

The reductant injector system 124 includes a reagent tank 140, a filter 142, and a pump 144. The reagent tank 140 holds a reagent, such as ammonia or urea, which is filtered and pumped into the exhaust upstream from the SCR unit 26 via a reagent injector 146. The reagent mixes with the exhaust gas and decomposes prior to passing through at least one exhaust catalyst bed in the SCR unit 26. Once in the exhaust the reagent vaporizes, mixes with oxides of nitrogen and passes over a catalyst, which turns ozone-forming oxides on nitrogen (NOx) into water, nitrogen and carbon dioxide $CO_2$. The exhaust gas may be mixed by means of the mixer prior to passing through to the SCR catalyst beds. There may be multiple catalyst layers within the first canister 128 to ensure adequate NOx conversion. The SCR catalyst beds may be based on titanium oxide with additions of metal oxides such as, for example, vanadium, molybdenum, tungsten oxide, and/or zeolite, which reacts with the ammonia and NOx to form environmentally harmless nitrogen, oxygen and water. The SCR catalyst beds may alternatively be based on other materials as is commonly known in the art.

The control module 24 regulates operation of the diesel engine system 10 including management of the SCR heating system 12, the air intake system 16, the fuel injection system 18, the glow plug system 20 and the exhaust system 22. For this reason, the control module 24 is considered part of each of the systems 16, 18, 20, 22. The control module 24 manages the diesel engine system 10 to quickly and efficiently increase the temperatures of the exhaust system 22, including temperatures of the DOC 122 and the SCR unit 26, upon engine startup. In one embodiment, the control module 24 supplies current to the EHC 28 upon engine startup. In another embodiment of the present invention, the control module 24 supplies current to the EHC 28 prior to engine startup. The control module 24 may predict, estimate, and/or determine that a startup procedure is to begin in the near future, such as in approximately 1-3 minutes. When it is determined that a startup procedure is to occur, the control module 24 may preheat the EHC 28, thereby allowing for the SCR unit 26 and the DOC 122 to more quickly increase in temperature upon startup.

Current to the EHC 28 is controlled and provided via the control module 24, switches 148 and a power source 150 to begin a heating process. The current from the power source 150 may be supplied directly to the EHC 28, as shown, or supplied to the control module 24 prior to being received by the EHC 28. The duration of the heating process varies. It is anticipated, that the heating process can last between 1-4 minutes. More specifically, electric energy heats the EHC 28 for a threshold period (e.g., 1-3 minutes). Exhaust passing through the EHC 28 is heated.

Figure 3:
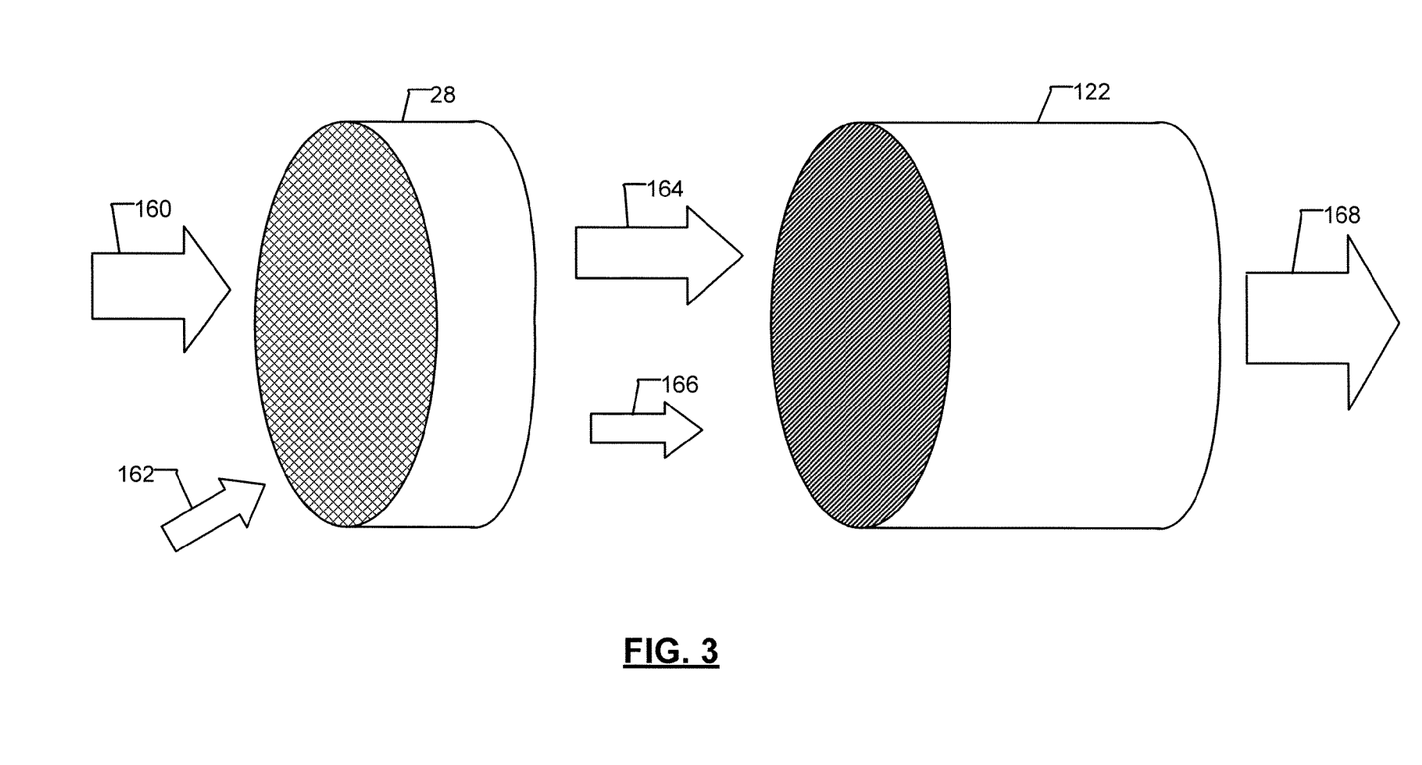
FIG. 3 is a thermal flow diagram of an exothermic reaction according to an embodiment of the present disclosure.

Referring now also to FIG. 3 in which a thermal flow diagram of an exothermic reaction is shown. The thermal flow diagram illustrates an EHC exhaust energy leveraging technique. The EHC 28 performs as a low mass catalyzed heating element and igniter. The EHC 28 heats and/or ignites exhaust, represented by arrow 160, which is passed into the DOC 122. The exhaust 160 includes combustion products, such as hydrogen (H2), hydrocarbons (HC), carbon monoxide (CO) and oxygen (O2). Electrical energy in the form of current, represented by arrow 162, is provided to the EHC 28. The current 162 increases the temperature of the EHC 28, which increases thermal energy of the exhaust 160 to generate a first activation energy q1 exotherm and a second activation energy q2 that is electric based. The first activation energy q1 exotherm represents the exothermic energy of the exhaust products.

The first activation energy q1 and the second activation energy q2 are represented by arrows 164 and 166. The DOC 122 performs as a catalytic combustor.

The first activation energy q1 and the second activation energy q2 are provided to and activate the DOC 122, which provides a large thermal output, which is represented by a third activation energy q3 exotherm arrow 168. Thermal energy out of the DOC 122 is significantly larger than that out of the EHC 28. The large thermal output quickly increases temperature of the SCR unit 26. The above thermal reaction may be referred to as a fast converter light off, which provides low cold start emissions. In other words, emission output is decreased due to quick and efficient increase in DOC and SCR unit temperatures.

As an example, the temperature of the EHC 28 may be equal to a start temperature $S_t$ of the exhaust plus the energy $E_l$ added to the EHC 28 divided by the exhaust mass $E_m$ minus heat loss $H_l$, as provided by equation 1.

$$S_t = \frac{E_l}{E_m} - H_l \tag{1}$$

The energy added to the EHC $E_l$ divided by the exhaust mass $E_m$ equals the voltage V across terminals of the EHC 28 multiple by the current C supplied to the EHC 28 and the amount of time that current is supplied to the EHC 28, divided by the mass $EHC_m$ of the EHC, as shown by equation 2.

$$\frac{E_l}{E_m} = \frac{V \cdot C \cdot T}{EHC_m} \tag{2}$$

Since the mass $EHC_m$ and electrical resistance of the EHC 28 are constant the energy added $E_l$ divided by the exhaust mass $E_m$ may be set equal to a first constant $K_l$ multiplied by the square of the voltage V multiplied by time T, as provided in equation 3.

$$\frac{E_l}{E_m} = K_1 \cdot V^2 \cdot T \tag{3}$$

Heat loss may be set equal to a second constant $K_2$ multiplied by exhaust flow $E_f$ multiplied by the start temperature $S_t$, as provided in equation 4. The exhaust flow $E_f$ is measured in flow units per unit time.

$$H_1 = K_2 \cdot E_f \cdot S_t \tag{4}$$

The control module 24 may have a central processing unit, memory (RAM and/or ROM), and associated input and output buses or be of some other module form. The control module 24 may be a portion of a central vehicle main control unit, an interactive vehicle dynamics module, a power control module, an ignition controller, a control circuit having a power supply, combined into a single integrated controller, or may be a stand-alone controller as shown.

The diesel engine system 10 may include various sensors 170, which may be part of or shared by the SCR heating system 12, the air intake system 16, the fuel injection system 18, the glow plug system 20, the exhaust system 20 or other vehicle systems. The sensors 170 may include the timing sensors 80, as well as intake and exhaust sensors 172, air and fuel sensors 174, and other vehicle sensors.

The intake and exhaust sensors 172 may include temperature sensors 180, such as an EHC temperature sensor 182 and an SCR temperature sensor 184. The intake and exhaust sensors 172 may also include an EHC current sensor 186, pressure sensors 188, flow sensors 190, oxygen sensors 192, NOx sensors 194, and other exhaust sensors. The air and fuel sensors 174 may include air and fuel pressure sensors 196, air and fuel flow sensors 198 and other air and fuel sensors. The timing sensors 80, in addition to the crankshaft and camshaft sensors 82, may include a transmission sensor, a drivetrain sensor, or some other timing sensor. The sensors 170 may be used for status determination and control of the diesel engine system 10. The control module 24 determines when exhaust heating is to be performed and controls engine operation to facilitate efficient heating based on information received from the sensors 170.

Figure 4:
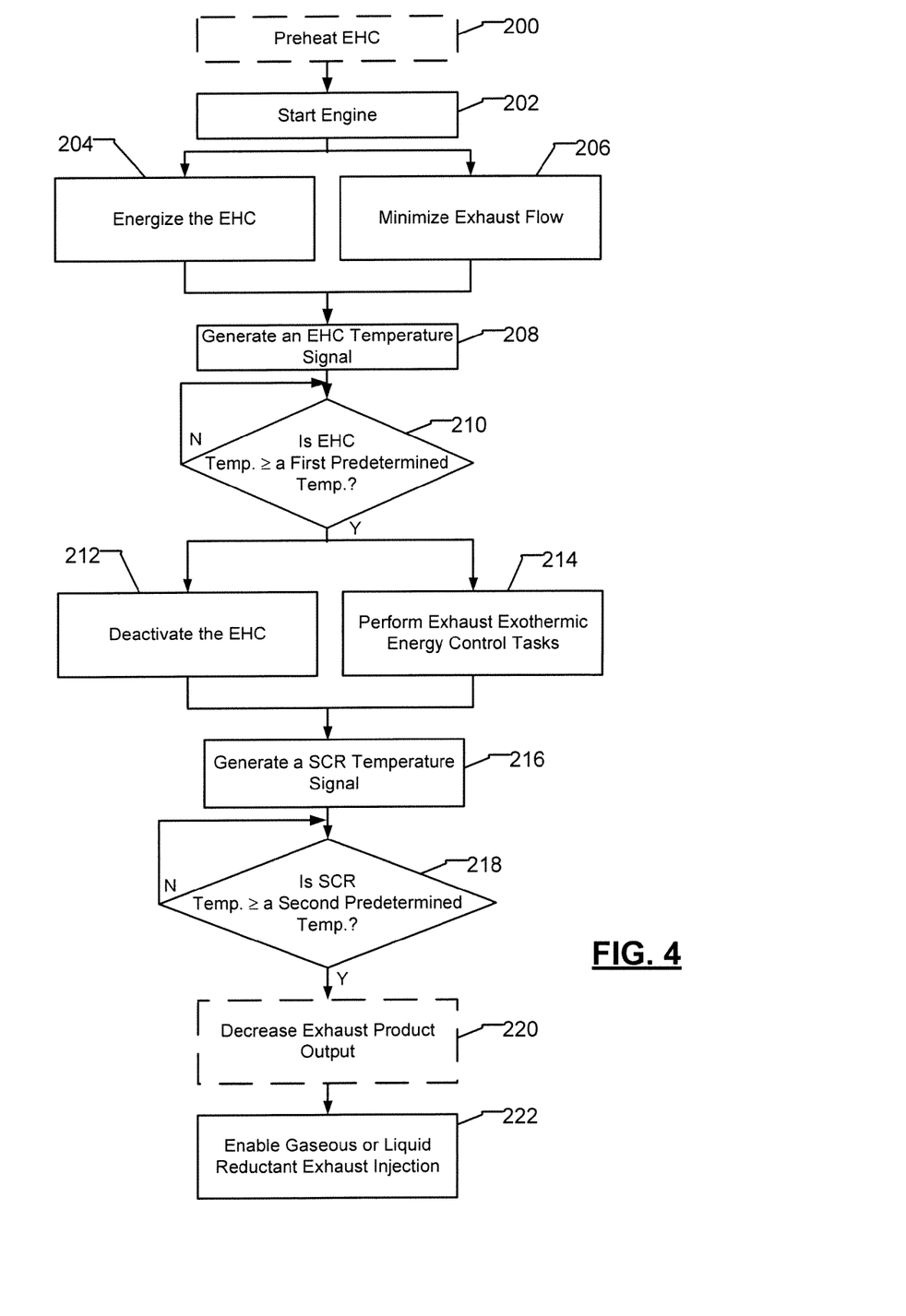
FIG. 4 is a logic flow diagram illustrating a method of operating an exhaust system in accordance with another embodiment of the present invention.

Referring now to FIG. 4, a flow chart illustrating a method of operating an exhaust system is shown. A control routine used to manage performance of the described method may be executed by the control module of FIGS. 1-2. Although the following steps are primarily described with respect to the embodiments of FIGS. 1 and 2, they may be easily applied to and/or modified for other embodiments of the present invention.

In step 200, the EHC 28 may be preheated prior to engine startup. The control module 24 may receive an engine startup signal and based thereon activate the SCR heating system 12 and supply current to energize the EHC 24. The startup signal may be based on state of the switch 62.

In step 202, the engine 14 is started. Air-intake, fuel, and glow plug systems are initialized. The control module 24 determines the position of the crankshaft 68 and the camshafts 72 using the crankshaft and camshaft sensors 82. Ignition reference and injection reference engine cylinders are determined in response to the crankshaft and camshaft positions, respectively. The ignition reference engine cylinder is that in which a piston is nearing the end of a compression stroke. The injection reference cylinder is that in which the piston is nearing the beginning of an intake stroke. Synchronization values, such as an ignition system synchronization value, a fuel system synchronization value, air flow synchronization values, and other synchronization values, may be determined. The synchronization values may be determined based on the positions of the crankshaft 68 and camshafts 72.

In step 204, the SCR heating system 12 is activated when not previously activated, such as in step 200.

In step 206, the control module 24 reduces and/or minimizes exhaust flow. An EHC start-up strategy algorithm may be enabled to reduce exhaust flow and improve heating performance of the EHC 28. To reduce exhaust flow, the control module 24 may generate lean fuel pulses prior to top dead center of the pistons 84. The control module 24 may also reduce air intake, via the air intake system 16. When an idle air control valve is utilized, position thereof may be adjusted. The revolutions-per-minute (RPM) of the engine 14 may be reduced, which reduces exhaust flow and allows the EHC 28 to heat up more quickly. The EHC 28 may be heated to approximately 400-500° C.

In step 208, the control module 24 receives or generates an EHC temperature signal. The EHC temperature signal may be generated directly by the EHC sensor 182 or generated indirectly. When generated indirectly, the EHC temperature signal may be estimated or determined based on temperature of the exhaust, flow of the exhaust, power supplied to the EHC 28, or other parameters.

In step 210, when the EHC 28 reaches a predetermined temperature, the control module 24 proceeds to steps 212 and 214. The predetermined value is associated with a temperature at which exhaust product are consumed. In step 212, the control module 24 deenergizes the EHC 28.

In step 214, an exhaust exothermic energy control strategy is initiated to increase production output of exhaust products, such as hydrocarbons and carbon monoxide, of the engine 14. The air intake system 16 and the fuel injection system 18 are adjusted to increase exhaust product output. For example, air intake and fuel injection may be increased. As another example, the fuel to air ratio may be increased to provide a rich intake pulse in the associate engine cycle, such as prior to top-dead-center of a piston cycle. Fuel may also be injected in an exhaust stroke to increase exhaust product output. The exhaust products generate an exothermic reaction when in contact with a heated element and/or a hot catalyst. This reaction generates a large amount of thermal energy that enables exhaust aftertreatment technologies to operate efficiently and sooner. The heated exhaust through the EHC 28 enables the DOC 122 and the SCR unit 26 to become fully active.

In step 216, an SCR temperature signal is generated. The SCR temperature signal may be directly generated via the SCR temperature sensor or indirectly. The SCR temperature may also be indirectly estimated or determined based on temperature of the exhaust, flow of the exhaust, power supplied to the EHC 28, or other parameters. When the SCR unit 26 reaches a second predetermined temperature, such as approximately 200° C., the SCR unit 26 is in an active state. When the temperature of the SCR unit 26 is less than 200° C., the SCR unit 26 is in an inactive state or partially active state.

In step 218, when the SCR unit 26 reaches the second predetermined temperature, the control module 24 proceeds to steps 220. In step 220, the exhaust product output may be decreased to provide a normal output for a current engine operating or driving condition. In step 222, when the SCR unit 26 reaches the second predetermined temperature, a gaseous and/or liquid reductant injection may be initiated into the exhaust via the reductant injector system 124.

The above-described steps are meant to be illustrative examples; the steps may be performed sequentially, synchronously, simultaneously, or in a different order depending upon the application. Note that one or more of the above-steps may be repeated or performed during operation of the engine when temperature of the SCR unit 26 drops below or is below the second predetermined temperature. As such, the control module 24 operates the SCR heating system 12 to maintain the SCR unit 26 at the second predetermined temperature. This maintains efficient and effective filtering of the exhaust system 22.

The above-disclosed embodiments include integrated engine control and leverage exhaust energy to provide low tailpipe emissions during and upon startup of an engine.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An exhaust system comprising:
a heating element that is disposed downstream from an engine and that introduces thermal energy into an exhaust of said engine;
a selective catalyst reduction (SCR) unit that is disposed downstream from said heating element and that filters nitrogen oxides (NOx) within said exhaust; and
a control module that is in communication with and that energizes said heating element based on a first temperature of said SCR unit,
wherein said control module operates said engine to increase exhaust product output when a second temperature of said heating element is greater than or equal to a first predetermined temperature.

2. The exhaust system of claim 1 wherein said control module energizes said heating element based on activation of said engine.

3. The exhaust system of claim 1 further comprising a diesel oxidization catalyst disposed downstream from said heating element and upstream from said SCR unit.

4. The exhaust system of claim 1 wherein said SCR unit includes a catalyst substrate that reduces activation energy of said exhaust.

5. The exhaust system of claim 1 wherein said control module operates said engine to increase said exhaust product output until said first temperature of said SCR unit is greater than or equal to a second predetermined temperature.

6. The exhaust system of claim 1 wherein said control module operates said engine and said exhaust system to increase said exhaust product output and temperature of said SCR unit while deactivating said heating element.

7. The exhaust system of claim 1 wherein said control module operates said engine to reduce flow of said exhaust based on said second temperature of said heating element.

8. The exhaust system of claim 7 wherein said control module determines said second temperature based on flow rate of said exhaust, power to said heating element, and exhaust temperature.

9. The exhaust system of claim 1 wherein said control module:
deenergizes said heating element when said second temperature of said heating element is greater than or equal to said first predetermined temperature; and
operates said engine to increase temperature of said SCR unit by increasing said exhaust product output including increasing output of at least one of hydrocarbons and carbon monoxide of said exhaust.

10. The exhaust system of claim 9 further wherein said control module operates said engine to increase said exhaust product output until said first temperature is greater than or equal to a second predetermined temperature.

11. A diesel exhaust system comprising:
a heating element that is disposed downstream from a diesel engine and that introduces thermal energy into an exhaust of said diesel engine;
a diesel oxidation catalyst that is disposed downstream from said heating element and that removes at least one of hydrocarbons and carbon monoxide from said exhaust;
a selective catalyst reduction (SCR) unit that is disposed downstream from said diesel oxidation catalyst and that filters nitrogen oxides (NOx) within said exhaust; and
a control module that is in communication with and that energizes said heating element based on a first temperature of said SCR unit,
wherein said control module operates said engine to increase exhaust product output until said first temperature of said SCR unit is greater than or equal to a predetermined temperature.

12. The exhaust system of claim 11 wherein said control module energizes said heating element based on activation of said diesel engine.

13. The exhaust system of claim 11 wherein said control module energizes said heating element during a time period selected from at least one of a first time period and a second time period, wherein said first time period is prior to startup of said diesel engine and said second time period begins during a startup process of said diesel engine.

14. The exhaust system of claim 11 wherein said control module operates said engine and said exhaust system to increase said exhaust product output and temperature of said SCR unit while deactivating said heating element.

15. A method of operating an exhaust system comprising:
generating an engine startup signal;
energizing an electrically heated catalyst (EHC), which is disposed downstream from a diesel engine and that introduces thermal energy into an exhaust of said diesel engine, based on said engine startup signal;
filtering nitrogen oxides (NOx) within said exhaust system via a selective catalyst reduction (SCR) unit that is disposed downstream from said EHC;
determining a first temperature of said SCR unit,
wherein said EHC is energized based on said first temperature; and
operating said diesel engine to increase exhaust product output and temperature of said SCR unit when a second temperature of said EHC is greater than or equal to a predetermined temperature.

16. The method of claim 15 wherein energizing said EHC is performed during a time period selected from at least one of a first time period and a second time period, wherein said first time period is prior to startup of said diesel engine and said second time period that begins during a startup process of said diesel engine.

17. The method of claim 15 further comprising:
generating an EHC temperature signal; and
reducing exhaust product generation based on said engine startup signal and said EHC temperature signal.

18. The method of claim 15 further comprising:
generating an EHC temperature signal;
deenergizing said EHC based on said EHC temperature signal; and
increasing exhaust product output of said diesel engine based on said EHC temperature signal.

19. The method of claim 15 further comprising:
generating an SCR temperature signal;
decreasing said exhaust product output based on said SCR temperature signal.

20. The method of claim 15 further comprising:
generating an SCR temperature signal; and
initiating at least one of gaseous reductant and liquid reductant injection into said exhaust based on said SCR temperature signal.

21. The exhaust system of claim 15 further comprising:
generating an EHC temperature signal;
decreasing said exhaust product output based on said engine startup signal and said EHC temperature signal prior to said second temperature of said EHC being greater than or equal to said predetermined temperature;
generating an SCR temperature signal; and
decreasing said exhaust product output based on said SCR temperature signal subsequent to said second temperature of said EHC being greater than or equal to said predetermined temperature.

* * * * *